(12) United States Patent
Beck et al.

(10) Patent No.: US 12,667,811 B2
(45) Date of Patent: Jun. 30, 2026

(54) DEVICE FOR CUTTING HOLLOW FIBER MEMBRANES

(71) Applicant: GAMBRO LUNDIA AB, Lund (SE)

(72) Inventors: Christof Beck, Bitz (DE); Rainer Blickle, Bitz (DE); Stefan Ermantraut, Balingen (DE); Bernd Hertzler, Balingen (DE); Steffen Wagner, Messstetten (DE)

(73) Assignee: GAMBRO LUNDIA AB, Lund (SE)

( * ) Notice: Subject to any disclaimer, the term of this patent is extended or adjusted under 35 U.S.C. 154(b) by 331 days.

(21) Appl. No.: 17/787,730

(22) PCT Filed: Dec. 29, 2020

(86) PCT No.: PCT/EP2020/087957
§ 371 (c)(1),
(2) Date: Jun. 21, 2022

(87) PCT Pub. No.: WO2021/136766
PCT Pub. Date: Jul. 8, 2021

(65) Prior Publication Data
US 2023/0074327 A1      Mar. 9, 2023

(30) Foreign Application Priority Data
Dec. 31, 2019    (EP) .................................... 19220171

(51) Int. Cl.
*B01D 63/02*        (2006.01)
*B01D 69/08*        (2006.01)
(Continued)

(52) U.S. Cl.
CPC ....... *B01D 63/0231* (2022.08); *B01D 69/081* (2013.01); *B01D 69/087* (2013.01); *B01D 69/0871* (2022.08); *B01D 71/441* (2022.08);

*B01D 71/68* (2013.01); *B26D 1/265* (2013.01); *D01D 5/06* (2013.01); *D01D 5/24* (2013.01);
(Continued)

(58) Field of Classification Search
CPC .. B01D 69/0871; B01D 71/441; B01D 71/68; B01D 63/0231; B01D 69/081; B01D 69/087; B26D 1/265; D01D 5/06; D01D 5/24; D01F 6/14; D01F 6/78; D10B 2321/06; D10B 2331/06; D10B 2505/04
See application file for complete search history.

(56) References Cited

U.S. PATENT DOCUMENTS 4,224,094 A       9/1980   Amicel et al.
5,322,228 A *    6/1994   Nagayama ........... B65H 57/003
242/487.3
(Continued)

FOREIGN PATENT DOCUMENTS

EP          3037156        6/2016
EP          3405277        11/2018
(Continued)

OTHER PUBLICATIONS

PCT Search Report and Written Opinion prepared for PCT Application No. PCT/EP2020/087957, completed Mar. 29, 2021.

*Primary Examiner* — Phong H Nguyen
(74) *Attorney, Agent, or Firm* — Barnes & Thornburg LLP

(57) ABSTRACT

The present disclosure relates to a device and a process for cutting hollow fiber membranes having a large inner diameter.

7 Claims, 1 Drawing Sheet

(51) Int. Cl.

| | |
|---|---|
| *B01D 71/44* | (2006.01) |
| *B01D 71/68* | (2006.01) |
| *B26D 1/26* | (2006.01) |
| *D01D 5/06* | (2006.01) |
| *D01D 5/24* | (2006.01) |
| *D01F 6/14* | (2006.01) |
| *D01F 6/78* | (2006.01) |

(52) U.S. Cl.
CPC .................. *D01F 6/14* (2013.01); *D01F 6/78*
(2013.01); *D10B 2321/06* (2013.01); *D10B*
*2331/06* (2013.01); *D10B 2505/04* (2013.01)

(56)                     References Cited

U.S. PATENT DOCUMENTS

| | | | |
|---|---|---|---|
| 2017/0189856 A1 | 7/2017 | Ideguchi et al. | |
| 2017/0368507 A1* | 12/2017 | Bauer .................... | B01D 71/68 |
| 2018/0243783 A1* | 8/2018 | Marschke ............. | B01D 69/08 |
| 2019/0002334 A1* | 1/2019 | Fazio ..................... | B26D 1/405 |

FOREIGN PATENT DOCUMENTS

| | | |
|---|---|---|
| KR | 101771673 | 8/2017 |
| WO | WO2017/125470 | 7/2017 |

* cited by examiner

10

DEVICE FOR CUTTING HOLLOW FIBER MEMBRANES

CROSS-REFERENCE TO RELATED APPLICATIONS:

This application is a national stage entry under 35 U.S.C. § 371 (b) of PCT International Application No. PCT/EP2020/087957, filed Dec. 29, 2020, which claims the benefit of European Patent Application Serial No. 19220171.3, filed on Dec. 31, 2019, the entire disclosures of both of which are incorporated herein by reference.

TECHNICAL FIELD

The present disclosure relates to a device and a process for cutting hollow fiber membranes having a large inner diameter.

DESCRIPTION OF THE RELATED ART

Liquids destined to be infused into a patient's body, in particular into the bloodstream of a patient, have to be free of pyrogens and particulate matter. To protect the patient, infusion solutions therefore typically are passed through a filter device installed in the infusion line before they enter the patient's body. Commercially available devices generally comprise a microporous flat sheet membrane. Filter devices comprising hollow fiber membranes instead of flat sheet membranes also have been proposed.

EP 3 405 277 A1, EP 3 431 171 A1 and EP 3 388 141 A1 disclose semipermeable hollow fiber membranes having a large inner diameter and comparatively thin walls, as well as sterilizing filters for dead-end filtration of medical liquids comprising these semipermeable hollow fiber membranes.

Due to their large inner diameter and the comparatively thin wall, these hollow fiber membranes are easily damaged by mechanical stress and require particular care during processing.

US 2017/189856 A1 relates to a manufacturing method for a hollow fiber membrane sheet comprising: accepting a hollow fiber membrane bundle, which is in a sheet state, of a length set in advance in which a plurality of hollow fiber membranes are aligned using one or more accepting means containing a drive roll; forming fixing parts at which the hollow fiber membranes are fixed in a widthwise direction of the hollow fiber membrane bundle using a fixing means after accepting the hollow fiber membrane bundle of the length set in advance; and cutting the hollow fiber membrane bundle at the fixing parts or on the vicinity thereof.

EP 3 037 156 A1 discloses a device for continuous on-line drying of permselective hollow fiber membranes in a two-stage drying and tempering process.

U.S. Pat. No. 4,224,094 A discloses a process and apparatus for the simultaneous preparation of several hollow fiber devices, wherein at least one hollow fiber is wound around means, at least three in number, located in different planes thereby obtaining with this fiber an envelope having a polygonal section, which can be cut in at least two places as it is formed, so as to obtain at least two distinct groups of hollow fiber lengths.

KR 101 771 673 B1 relates to a continuous cutting device of a hollow fiber membrane spinning device. The continuous cutting device comprises a work table which is positioned in the lower part of a hollow fiber membrane on the moving direction of the hollow fiber membrane; a rear side moving device which is positioned on the rear side of the hollow fiber membrane; a front side moving device which is positioned in the front side of the hollow fiber membrane and is positioned to be symmetric with the rear side moving device on plane; a drive motor which rotates a rear one-side drive pulley and a front one-side drive pulley; a rear fixing device which supports the rear side of the hollow fiber membrane passing through the front side moving device by protruding toward the outline of a rear side belt; a front side fixing device which supports the front side of the hollow fiber membrane at a point supported by the rear side fixing device; and a cutting device which cuts the hollow fiber membrane supported by the front side fixing device and the rear side fixing device.

SUMMARY

The present application provides a device and a process for cutting hollow fiber membranes having a large inner diameter. The device is used in a process for producing sterilizing filters destined for dead-end filtration of liquids for infusion into a patient.

DETAILED DESCRIPTION

Figure 1:
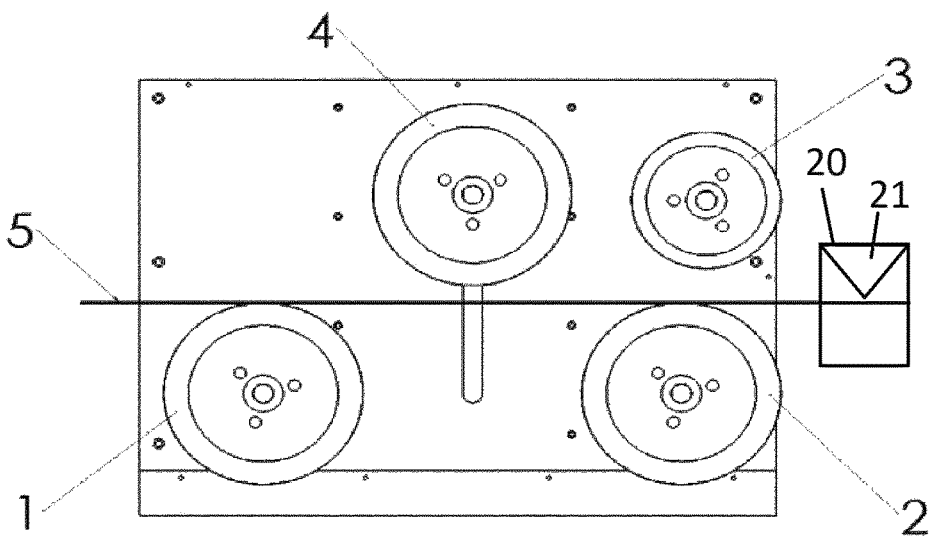
FIG. 1 is a schematic view of an embodiment of a transport unit in a threading configuration.

The present disclosure provides a device for cutting a single hollow fiber membrane. The device comprises a transport unit and a cutting unit comprising at least one rotating blade or knife. The transport unit is configured to feed a wet continuous filament of a hollow fiber membrane having an outer diameter which is larger than 3 mm and smaller than 4.5 mm, the ratio of inner diameter to wall thickness of the membrane being larger than 10, to the cutting unit. The device comprises four driven rollers which feed the continuous filament of a hollow fiber membrane to a rotating blade which cuts the hollow fiber membrane into pieces having a predefined length.

The device is used for cutting microporous hollow fiber membranes having a large inner diameter and thin walls, such as the hollow fiber membranes described in EP 3 405 277 A1 and EP 3 431 171 A1.

In one embodiment, the semipermeable hollow fiber membrane has an inner diameter of from 2.8 to 4.0 mm, for instance, from 3.0 to 3.7 mm, or from 3.1 to 3.5 mm; and a wall thickness of from 100 to 500 µm, for instance, from 180 to 320 µm. The outer diameter of the semipermeable hollow fiber membrane is larger than 3 mm and smaller than 4.5 mm. The ratio of inner diameter to wall thickness of the membrane is larger than 10, or even larger than 15.

In one embodiment, the semipermeable hollow fiber membrane has a mean flow pore size, determined by capillary flow porometry, in the range of from 0.2 to 0.5 µm.

Capillary flow porometry is a liquid extrusion technique in which the flow rates through wet and dry membranes at differential gas pressure are measured. Before measurement, the membrane is immersed in a low surface tension liquid (e.g., a perfluoroether commercially available under the trade name Porofil®) to ensure that all pores including the small ones are filled with the wetting liquid. By measuring the pressure at which the liquid is pressed out of the pores their corresponding diameter can be calculated using the Laplace equation. With this method, the pore size distribution of those pores that are active in the mass transport is determined. Dead-end and isolated pores are omitted. The hollow fiber membranes are measured inside-out.

$$Dp = 4\gamma \cos \theta / \Delta P \qquad \text{Laplace equation}$$

$Dp$=diameter of pores [m]
$\gamma$=surface tension [N/m]; for Porofil® 0.016 [N/m]
$\Delta P$=pressure [Pa]
Cos $\theta$=contact angle; for complete wetting cos $\theta$=1

In one embodiment, the semipermeable hollow fiber membrane comprises polyethersulfone (PESU) and polyvinylpyrrolidone (PVP). In one embodiment, the semipermeable hollow fiber membrane additionally comprises a polymer bearing cationic charges. Examples of suitable polymers bearing cationic charges include polyethyleneimines, modified polyethyleneimines, and modified polyphenyleneoxides.

In one embodiment, the continuous filament of a hollow fiber membrane is produced by a continuous solvent phase inversion spinning process comprising extruding a polymer solution through an outer ring slit of a nozzle with two concentric openings into a precipitation bath while simultaneously extruding a center fluid through the inner opening of the nozzle. In one embodiment, the process involves subsequent washing of the membrane obtained.

The hollow fiber membrane is cut while it is still wet. As the hollow fiber membrane is still very delicate at this stage, and highly susceptible to mechanical damage or collapse, it is important that mechanical stress to the hollow fiber membrane is minimized.

Therefore, the hollow fiber membrane has to be transported by a method that is both gentle and effective. The device of the present disclosure uses driven rollers to transport the hollow fiber membrane towards a cutting device. In one embodiment, the rollers feature a groove having a profile with a curvature matching the curvature of the perimeter of the hollow fiber membrane. In a further embodiment, the groove of the rollers is coated with a material enhancing friction between the roller and the hollow fiber membrane, for instance, rubber or another polymer coating.

The device of the present disclosure features a transport unit which comprises four driven rollers, a first, second and fourth roller having the same diameter, and a third roller having a smaller diameter than the other three. The first and the second roller are stationary, and the connecting line between their centers define a horizontal direction; the third and the fourth roller are moveable in a direction perpendicular to the direction defined by connecting the centers of the first and the second roller. The center of the fourth roller is located between and above the centers of the first and the second roller. The center of the third roller is located above the center of the second roller and is shifted further along the direction defined by connecting the centers of the first and the second roller beyond the center of the second roller, such that a tangent touching both the perimeter of the second and the third roller on the side facing away from the first roller is perpendicular to the direction defined by connecting the centers of the first and the second roller. This allows for a very compact design of the transport unit.

The first roller and the second roller define the level of the inlet and the outlet of the transport unit. The level of the inlet and the outlet, respectively, of the transport unit has to be adjusted to the production equipment upstream and downstream, respectively, of the transport unit. In other words, the inlet has to be on the same level as the feed of the hollow fiber membrane, and the outlet has to be on a level suitable for feeding the cutting unit. Typically, the inlet and the outlet are on the same level.

The configuration of the transport unit can be changed between a threading configuration which allows for threading a continuous filament of a hollow fiber membrane into the transport unit; and a working configuration for transporting a hollow fiber membrane filament and feeding it to a cutting device.

In the threading configuration, the third and the fourth roller are in an upper position and the perimeters of the third and fourth roller do not touch a hollow fiber membrane positioned on the first and second roller. Therefore, an end of a continuous hollow fiber membrane filament can easily be threaded over the first and second roller.

For entering the working configuration, the third and the fourth roller are moved downward into their respective working positions.

The fourth roller enlaces the hollow fiber membranes and cooperates with the first and the second roller to create sufficient friction for fiber transport. The angle of enlacement can be varied by the vertical position of the roller. The lower the fourth roller is moved, the more friction is generated between the fiber and the treads of the rollers. The position of the fourth roller is adjusted to both provide sufficient friction for reliable fiber transport and minimize mechanical stress on the hollow fiber membrane. In one embodiment, the centers of the first, second, and fourth rollers are on the same level in the working configuration of the transport unit.

The third roller deflects the hollow fiber membrane back into a horizontal direction. This is important for the next process step, i.e., the cutting step. The third roller has a smaller diameter than the other rollers and its center is farther away from the first roller in horizontal direction than the center of the second roller. This is helpful for deflecting the fiber into a horizontal direction. The position of the third roller is critical. If the third roller is positioned too close to the second roller, the fiber could be squeezed, causing deformation of the fiber or mechanical damage to it. If the position of the third roller is too high, i.e., too far away from the second roller, the fiber is not correctly deflected into a horizontal direction, which could cause difficulties in the next process step, where the fiber is cut to a defined length by a rotating blade or knife.

The device of the present disclosure also comprises a cutting unit 20 positioned downstream the transport unit. The cutting unit comprises at least one rotating blade 21 or knife. In one embodiment, the cutting unit features a plurality of blades mounted on a rotating wheel, the axis of the rotating wheel being parallel to the longitudinal axis of the hollow fiber membrane. In a further embodiment, the blades are mounted on the perimeter of the rotating wheel, the edges of each blade and the tangent to the perimeter of the rotating wheel at the exit point of the blade from the perimeter confining an angle of from 90° to 150°, e.g., from 120° to 135°.

The continuous filament of hollow fiber membrane is fed to the cutting unit and the hollow fiber membrane is cut to sections having a defined length by a rotating blade or knife. The direction of the cut is perpendicular to the longitudinal axis of the hollow fiber membrane. This method has proven to yield a precise cut without deforming or fraying the hollow fiber membrane.

The present disclosure also provides a process for the production of hollow fiber membranes having a predefined length. The process involves feeding a continuous filament of a hollow fiber membrane through a transport unit of the present disclosure and into a cutting unit of the present disclosure and cutting the continuous filament to sections having a defined length by a rotating blade or knife. In one embodiment of a continuous process, the length of the sections is determined by the quotient of the transport velocity of the fiber divided by the number of revolutions of the rotating blade or knife. In another embodiment, the continuous filament each time is first advanced by a predetermined distance and subsequently cut by the rotating blade or knife. In this embodiment, the rotating blade or knife either operates in intervals, or is moved towards the continuous filament for each cut and moved back to a position away from the filament after each cut.

In one embodiment, the predefined length is in the range of from 5 cm to 40 cm, for instance, from 20 cm to 40 cm, e.g., 30 cm.

Exemplary embodiments of the device of the present disclosure are shown in the accompanying figures and are described below. It will be understood that the features mentioned above and those described hereinafter can be used not only in the combination specified but also in other combinations or on their own, without departing from the scope of the present invention.

FIG. 1 is a schematic view of an embodiment of a transport unit 10 in a threading configuration. A first roller 1 and the second roller 2 define the level of the inlet and the outlet, respectively, of the transport unit 10. The level of the inlet and the outlet, respectively, has to be adjusted to the production equipment upstream and downstream, respectively, of the transport unit 10. Typically, the inlet and the outlet are on the same level. The first roller 1 and the second roller 2 have the same diameter and their position is fixed. In the embodiment shown, the axes of the rollers are on the same level, i.e., they are aligned in horizontal direction.

The fourth roller 4 has the function to enlace the fiber 5 and create sufficient friction to transport the fiber 5. The angle of enlacement can be varied by the vertical position of the roller. The fourth roller 4 has the same diameter as the first roller 1 and the second roller 2. It is positioned between the first roller 1 and the second roller 2 and is moveable along a line which is perpendicular to the line joining the centers of the first roller 1 and the second roller 2.

The third roller 3 has the function to deflect the fiber 5 back into a horizontal direction. This is important for the next process step, i.e., cutting the fiber 5. The third roller 3 has a smaller diameter than the other rollers 1, 2, 4. It is positioned above the second roller 2 such that the perimeters of the second roller 2 and the third roller 3 are flush at the outlet side of the transport unit 10, i.e., a tangent touching the perimeters of both the second roller 2 and the third roller 3 on the side facing away from the first roller 1 is perpendicular to the line joining the centers of the first roller 1 and the second roller 2. This allows for a compact design of the transport unit 10. The center of the third roller 3 is located nearer the outlet of the transport unit 10 in horizontal direction than the center of the second roller 2, i.e., downstream from center of the second roller 2. This arrangement is helpful to guide the fiber 5 into a horizontal direction. The third roller is moveable along a line which is perpendicular to the line joining the centers of the first roller 1 and the second roller 2.

Figure 2:
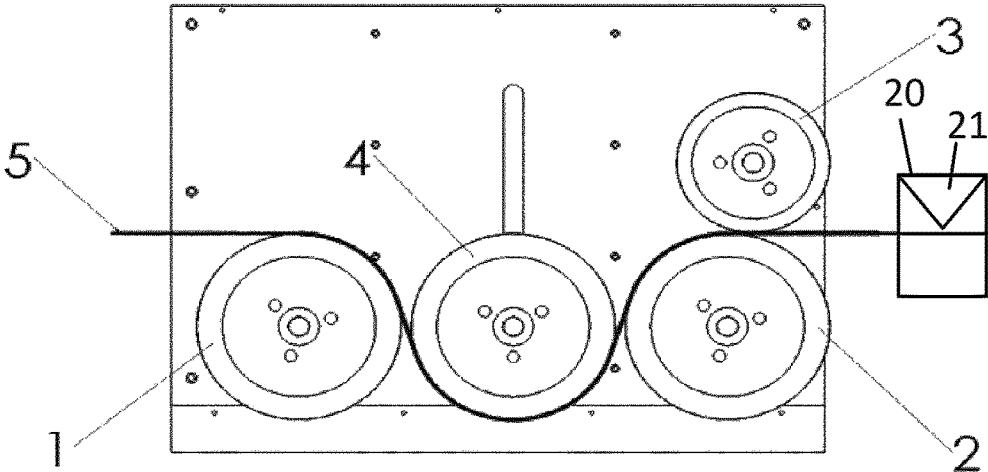
FIG. 2 is a schematic view of the unit of FIG. 1 in a working configuration.

FIG. 2 shows the transport unit 10 in a working configuration, with the third roller 3 and the fourth roller 4 in their transport position, i.e., after the third roller 3 and the fourth roller 4 have been moved downwards. The fiber 5 is trans-ported by the first roller 1, the fourth roller 4 and the second roller 2 which generate sufficient friction in contact with the fiber 5.

The third roller 3 deflects the fiber 5 into a horizontal direction. The position of the third roller 3 is critical. If the third roller 3 is too close to the second roller 2, the fiber 5 could be squeezed or damaged. If the position of the third roller 3 is too high, the fiber 5 is not correctly deflected into a horizontal direction, this causes problems in the subsequent process step, where the fiber is cut to a defined length by a rotating knife.

LIST OF REFERENCE SIGNS

10 transport unit
1 first roller
2 second roller
3 third roller
4 fourth roller
5 continuous hollow fiber membrane filament

The invention claimed is:

1. A device for cutting a single hollow fiber membrane comprising (i) a transport unit and (ii) a cutting unit comprising at least one blade, wherein the transport unit is configured to feed a wet continuous filament of a hollow fiber membrane to the cutting unit, wherein the hollow fiber membrane has an outer diameter larger than 3 mm and smaller than 4.5 mm, and wherein the ratio of inner diameter to wall thickness of the membrane is larger than 10, wherein the transport unit comprises a first roller, a second roller, a third roller, and a four roller, wherein each of the four rollers feature a groove having a profile with a curvature matching the curvature of the perimeter of the hollow fiber membrane, and wherein each of the four rollers comprises a center, wherein the first roller and the second roller are each stationary, and wherein a line connecting the center of the first roller and the center of the second roller defines a horizontal direction, wherein the center of the third roller is located above the center of the second roller, such that the perimeters of the second roller and the third roller are flush at the outlet side of the transport unit, wherein the first roller and the fourth roller have the same diameter, and wherein the center of the fourth roller is located between and above the center of the first and the center of the second roller, and wherein the configuration of the transport unit can be changed between a threading configuration and a working configuration, and wherein in the working configuration the center of the fourth roller is on the line connecting the center of the first roller and the center of the second roller.

2. The device of claim 1, wherein the first roller, the second roller and the fourth roller have the same diameter.

3. The device of claim 2, wherein the third roller has a smaller diameter than the first roller, the second roller, and the fourth roller.

4. The device of claim 1, wherein the center of the fourth roller is located between the center of the first roller and the center of the second roller.

5. The device of claim 1, wherein i) in the threading configuration, the third roller and the fourth roller have been moved into an upper position, in which the third roller and the fourth roller do not touch a continuous filament of a hollow fiber membrane located on the first roller and the second roller of the transport unit, which allows for threading a continuous filament of a hollow fiber membrane into the transport unit; and ii) in the working configuration, the third roller and the fourth roller have been moved downward into a lower position, in which the third roller and the fourth roller touch the continuous filament located on the first roller and the second roller, for transporting the continuous filament and feeding it to the cutting unit.

6. The device of claim 1, wherein the cutting unit comprises a plurality of blades mounted on a rotating wheel, the axis of the rotating wheel being parallel to the longitudinal axis of the continuous filament of a hollow fiber membrane.

7. The device of claim 1, wherein the third roller and the fourth roller are moveable in a direction perpendicular to the horizontal direction.

\* \* \* \* \*